E. YOUNG.
Machine for Sawing Hoops.

No. 165,910. Patented July 20, 1875.

Attest:
Edward Barthel.
Wm. P. Spalding.

Inventor:
E. Young
By Atty
Thos. S. Sprague

UNITED STATES PATENT OFFICE.

EDWARD YOUNG, OF SARNIA, CANADA.

IMPROVEMENT IN MACHINES FOR SAWING HOOPS.

Specification forming part of Letters Patent No. 165,910, dated July 20, 1875; application filed January 22, 1875.

*To all whom it may concern:*

Be it known that I, EDWARD YOUNG, of Sarnia, in the county of Lambton and Province of Ontario, Canada, have invented an Improvement in Machines for Sawing Hoops, of which the following is a specification:

My invention relates to an improvement in hoop-sawing machines of that class where the hoops are ripped from planks by a gang or gangs of circular saws; and it consists in mounting in a frame two gangs of saws, one above the other, but with their arbors inclined to each other and their saws in intersecting planes, so as to rip a plank fed to them into strips thicker at one edge than at the other.

Figure 1:
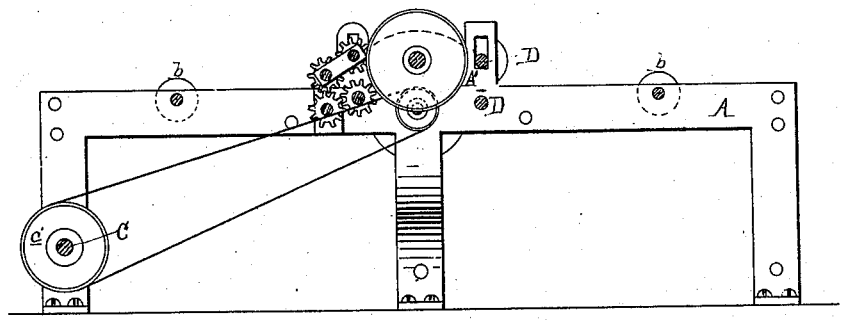
Figure 2:
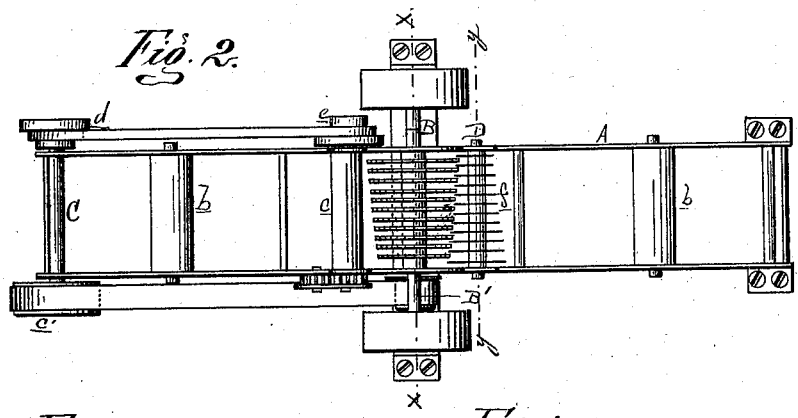
Figure 3:
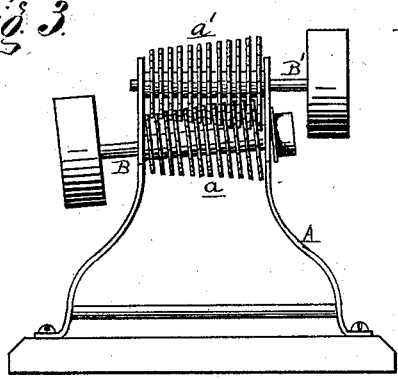
Figure 4:
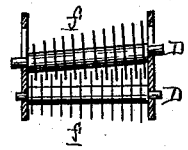

Figure 1 is a side elevation of the machine, with a portion of the frame broken away. Fig. 2 is a plan or top view. Fig. 3 is a cross-section through the saw-arbors at $x\ x$. Fig. 4 is a similar section through the steadying-rolls at $y\ y$.

In the drawing, A represents the frame of the machine, across the center of which is journaled a saw-arbor, B, inclined below the horizontal plane, and carrying a gang of circular saws, $a'$. Above this saw-arbor an arch, A', rises from the frame A, in which is journaled a second arbor, B', directly over the arbor B, and inclined in the opposite direction thereto. This arbor is also fitted with a gang of circular saws, $a'$. Each arbor has a pulley on its upper end, and they are driven by two belts from a drum overhead or beneath, as may be preferred. $b\ b$ are carrying-rollers, and $c$ are the feed-rolls, fitted with the usual expansion or universal gear to receive planks of varying thickness. C is a counter-shaft across one end of the frame, provided with a driving-pulley, $c'$, at one end, which is driven by a belt from the pulley on the lower end of the arbor B, and with a cone-pulley, $d$, at the other end, from which a belt passes around a cone, $e$, on the end of one of the feed-rolls, to drive the latter.

By referring to Fig. 3 it will be seen that the saws of one gang enter the spaces between those of the other, both gangs rotating in intersecting planes, so that if a plank be fed to the saws they will rip it into beveled strips suitable for hoops, or for any other purpose requiring strips of such shape. Just behind the saws two shafts, D, are journaled in standards across the frame, each shaft carrying a gang of disks or collars, $f$, which separate, but at the same time support, the strips as they come through the saws.

What I claim as my invention, and desire to secure by Letters Patent, is—

1. A hoop-sawing machine having two gangs of saws, one above the other, and inclined in intersecting planes, substantially as described.

2. The steadying-collars $f$ and shafts D, in combination with two gangs of saws whose arbors are inclined in their supporting-frame, substantially as described.

EDWARD YOUNG.

Witnesses:
ROBERT S. GURD,
WM. I. GURD.